United States Patent
Yamamoto

(10) Patent No.: US 6,613,365 B1
(45) Date of Patent: Sep. 2, 2003

(54) ANIMAL FEED AND PRODUCTION METHOD THEREOF

(76) Inventor: Masahiro Yamamoto, #1103 Seaside Mansion, 26-1 Kamoike-shinmachi, Kagoshima-shi, Kagoshima-ken (JP)

( * ) Notice: Subject to any disclaimer, the term of this patent is extended or adjusted under 35 U.S.C. 154(b) by 0 days.

(21) Appl. No.: 09/720,727

(22) PCT Filed: May 8, 2000

(86) PCT No.: PCT/JP00/02930
§ 371 (c)(1),
(2), (4) Date: Mar. 6, 2001

(87) PCT Pub. No.: WO00/67588
PCT Pub. Date: Nov. 16, 2000

(30) Foreign Application Priority Data

May 6, 1999 (JP) .......................................... 11-126243

(51) Int. Cl.⁷ .............................. A23K 1/06; A23K 1/08; A23K 1/10
(52) U.S. Cl. ......................... 426/53; 426/54; 426/635; 426/805; 426/807
(58) Field of Search ........................... 426/53, 54, 635, 426/805, 807

(56) References Cited

U.S. PATENT DOCUMENTS

| | | | |
|---|---|---|---|
| 3,272,633 A | | 9/1966 | Clickner ............................ 99/9 |
| 4,018,650 A | * | 4/1977 | Busta ......................... 195/28 R |
| 4,028,470 A | * | 6/1977 | Hayashi et al. |
| 4,298,621 A | | 11/1981 | Samis et al. .................... 426/55 |
| 5,352,464 A | * | 10/1994 | Kotegawa |
| 5,853,779 A | * | 12/1998 | Takebe et al. ................. 426/20 |

FOREIGN PATENT DOCUMENTS

| | | | |
|---|---|---|---|
| EP | 357320 | | 3/1990 |
| GB | 1489592 | | 10/1977 |
| JP | 49-27790 | | 7/1974 |
| JP | 53-069178 | | 6/1978 |
| JP | 53-086377 | | 7/1978 |
| JP | 57-174061 | | 10/1982 |
| JP | 58-190356 | | 11/1983 |
| JP | 62-179352 | | 8/1987 |
| JP | 64-20090 | | 1/1989 |
| JP | 3-147750 | | 6/1991 |
| JP | 4-131047 | | 5/1992 |
| JP | 6-78686 | | 3/1994 |
| JP | 6-070742 | | 3/1994 |
| JP | 7-75563 | | 3/1995 |
| JP | 7-231772 | | 9/1995 |
| JP | 8-000181 | | 7/1996 |
| JP | 08214822 | * | 8/1996 |

* cited by examiner

Primary Examiner—Chhaya D. Sayala
(74) Attorney, Agent, or Firm—Finnegan, Henderson, Farabow, Garrett & Dunner, L.L.P.

(57) ABSTRACT

Animal feed is obtained by mixing a grain material and/or a fiber material with at least one industrial waste selected from the group consisting of fish-broth effluents, fish viscera, animal wastes, and distillatory effluents, to form a mixture. Subsequently, koji mold is added to the mixture, then allowed to undergo fermentation, and then dried to form the animal feed. A method for producing animal feed comprises the steps of: mixing a grain material and/or a fiber material with at least one industrial waste selected from the group consisting of fish-broth effluents, fish viscera, animal wastes, and distillatory effluents to form a mixture, wherein the water content of the mixture is 45 wt % or less; adding koji mold to the mixture to cause fermentation; and drying the mixture by utilizing heat generated by the fermentation caused by the koji mold and, if necessary, by driving a current of air upon the mixture.

12 Claims, No Drawings

ANIMAL FEED AND PRODUCTION METHOD THEREOF

TECHNICAL FIELD

The present invention relates to animal feeds and production methods thereof. More particularly, the present invention relates to the animal feeds obtainable by fermenting a mixture of grains and/or fiber materials and wastes containing protein of animal origin, such as, those originating from fisheries, livestock industries and food industries, using koji mold, and production methods thereof. The present invention further relates to the use of koji mold in the production of animal feeds.

BACKGROUND ART

Most industrial wastes are discarded, these including industrial effluents produced in the production process of foods such as dried skipjacks, fish cakes (fish broth), animal waste produced in livestock industries, or distillatory effluents resulting from the distillation process in the production of liquors.

Only a small proportion of these industrial wastes which are abundant in organic ingredients have been utilized as efficient soil fertilizers although it is preferred in view of recycling.

One reason is that the wastes are bulky due to its substantial water content which makes it difficult to stock and transport the wastes. Their tendency to rot quickly is another reason which makes storage difficult. Accordingly, these waste products have been discarded without any effective uses, causing environmental problems such as pollution of the soil, groundwater, river and sea.

DISCLOSURE OF INVENTION

The present invention addresses the above-mentioned problems. It is an object of the present invention to effectively utilize wastes. It is another object of the present invention to provide a nutritious animal feed by fermenting a crude mixture containing the above-described industrial wastes using koji mold, in which process heat generated by fermentation is utilized to dehydrate the mixture, resulting in a less costly process. Yet another object of the present invention is to provide a method for producing such animal feed having an excellent shelf life. The method comprises controlling the water content of the mixture containing the above-described industrial wastes by making use of fermentation heat to dry the mixture.

In the first aspect, the present invention provides animal feed with enhanced digestiveness comprising koji mold and digestive enzymes produced thereby.

In the second aspect, the present invention provides animal feed produced by a process in which a grain material and/or a fiber material is mixed with at least one industrial waste selected from the group consisting of fish-broth effluents, fish viscera, animal wastes, and distillatory effluents, to form a mixture. Koji mold is then added to the mixture. The mixture is allowed to undergo fermentation and is dried, which completes the animal feed.

The present invention, which utilizes at least one industrial waste selected from the group consisting of fish-broth effluents, fish viscera, animal wastes, and distillatory effluents, can make effective use of the industrial wastes that would otherwise have been discarded. Amino acids that are contained in the above-described industrial wastes and that are useful in making the animal feed nutritious are efficiently recovered. Further, when fish broth or fish viscera are used, unsaturated fatty acids with low melting points that have been found to be an effective growth promoter can be efficiently recycled.

Thermophilic fungi have been typically used to process the wastes into a fertilizer. In such a case, most of the organic substances present in the processed matter are discomposed into carbon dioxide and water and are released into the atmosphere. In contrast, koji mold used in the present invention can resynthesize most of the organic substances into high quality fungal proteins although some parts are still converted to carbon dioxide and water through the fermentation process. Therefore, an advantage of the present invention is that useful substances are generated through the processing of organic waste matter, as compared with the conventional waste product processing in which organic wastes are mostly decomposed.

Also, due to the activity of koji mold, various enzymes such as amylases and proteases are abundantly accumulated in the animal feed of the present invention. These enzymes significantly facilitate digestion in the animals fed with the animal feed.

Further, kojic acid produced by koji mold is renowned as an anti-oxidant. Thus, the animal feed of the present invention enhances the inherent healing ability of animals fed with the animal feed of the present invention.

In one embodiment, the mixing ratio of the grain material and/or the fiber material to the industrial waste is preferably from 1:0.5 to 1:2 by weight. The preferred amount of the koji mold to be added is in the range of 0.05 wt % to 0.2 wt % with respect to the weight of the mixture. The efficiency of fermentation is maximized and the above-described advantages of the present invention become most significant by employing these mixing ratios.

Preferably, the water content of the animal feed after fermentation and the drying is 30 wt % or less.

In a third aspect of the present invention, a method for producing animal feed is provided. The method comprises the following steps: mixing a grain material and/or a fiber material with at least one industrial waste selected from the group consisting of fish-broth effluents, fish viscera, animal wastes, and distillatory effluents to form a mixture with the water content of 45 wt % or less; adding koji mold to the mixture to cause fermentation; and drying the mixture by utilizing heat generated by the fermentation caused by the koji mold and, if necessary, by driving a current of air upon the mixture.

The method of the present invention is advantageous in that such enzymes as amylases and proteases are produced, which enables the production of animal feed with high digestibility. The amount of enzymes, especially proteases, is nearly doubled as compared to conventional animal feeds, due to the protein-rich materials used.

The above-described fermentation and drying steps of the present invention may comprise a plurality of steps; that is, the drying step may preferably comprise mixing into the mixture an additional volume of at least one industrial waste when the water content of the mixture is reduced to 35 wt % or less. This makes a mixture having a water content in the range of 40 wt % to 45 wt %. The industrial waste is selected from the group consisting of fish-broth effluent, fish viscera, animal waste, and distillatory effluent. The mixture is allowed to continue with fermentation and drying to form the animal feed with a water content of 30 wt % or less.

An additional volume of at least one industrial effluent may also be added during the drying step when the water content of the mixture is reduced to 35 wt % or less, to form a mixture having a water content in the range of 40 wt % to 45 wt %. The industrial waste is selected from the group consisting of fish-broth effluents, fish viscera, animal wastes, and distillatory effluents. The mixture is allowed to continue with fermentation and drying until the water content is reduced to 35 wt % or less. The mixture is then mixed with a further volume of at least one industrial waste selected from the group consisting of fish-broth effluents, fish viscera, animal wastes, and distillatory effluents, to form a mixture having a water content in the range of 40 wt % to 45 wt %. The resulting mixture is allowed to continue with fermentation and drying to form an animal feed with a water content of 30 wt % or less.

The efficiency of fermentation is maximized and the above-described advantages of the present invention become most significant by employing these mixing ratios in the above-described multiple steps.

In the fourth aspect, the present invention provides a novel use of koji mold in the production of animal feed with enhanced digestiveness wherein koji mold is mixed with crude materials and laid for fermentation to produce digestive enzymes.

MODES FOR CARRYING OUT THE INVENTION

The preferred embodiments of the present invention will now be described in detail hereinafter.

Grain materials for use in the present invention include wheat, rice, corn, kaoliang, millet grain, wheat bran, rice bran, corn starch and rice flour.

Fiber materials for use in the present invention include rice bran, wheat bran, tofu refuse, strained lees of fruits, rice hull, and sawdust.

The grain materials and fiber materials described above may be used in the present invention either independently or in combination.

Industrial wastes for use in the present invention include at least one selected from the group consisting of fish broth, fish viscera, animal waste, and distillatory effluent resulting from the distillation of liquors. Components of the wastes are selected as appropriate depending on the purpose and may comprise a single component or a mixture of components.

Fish broths for use in the present invention includes the water used for boiling skipjack fish in manufacturing dried skipjack products, and those produced while manufacturing other fishery products such as fish cakes and canned fish products.

Fish viscera for use in the present invention include any parts of fish and not limited to internal organs, that have conventionally been removed from whole fish to be discarded in manufacturing fishery products and are therefore not limited to particular parts of fish.

Animal wastes for use in the present invention may include excreta produced in livestock industries by livestock including cows, horses, hogs, and poultry, or excreta produced by other animals and humans.

Distillatory effluents for use in the present invention include waste liquids produced while manufacturing distilled liquors such as shochu liquor, whiskey, brandy, and vodka.

Koji molds for use in the present invention include those that have conventionally been used in the production of koji, and preferably, those belonging to genus Aspergillus or genus Monascus. As genus spergillus, *Aspergillus orygae, Aspergillus sojae, Aspergillus Tamarii, Aspergillus Katsuobushi, Aspergillus Awamori Aspergillus niger*, and *Aspergillus glancus*, for example, may be used in the present invention. As genus Monascus, *Monascus purpureus* and *Monascus Anka* may be cited as examples. The grain materials and fiber materials are used as they are. It is preferable to sterilize the mixture by steaming after mixing the components.

The mixing ratio of the above-described grain materials, and/or fiber materials, to at least one of industrial wastes selected from the group consisting of fish broth, fish viscera, animal wastes, and distillatory effluents is preferably from 1:0.5 to 1:2 by weight when measured with water content. The typical water content for each of the components is as follows: about 15 wt % for grain materials, about 12 wt % for fiber materials, about 80 to 90 wt % for fish viscera, and about 95 wt % for fish broth and animal waste. It is not desirable for the proportion of the former to be large, since insufficient koji growth may take place, while it is not desirable for the proportion of the latter tobe large since the mixture will tend to rot.

In the present invention, the above-mentioned grain materials, and/or fiber materials, and at least one of industrial waste containing animal protein for example the one selected from the group consisting of fish broth, fish viscera, animal waste, and distillatory effluent are mixed with one another with the mixing ratio described above. The water content of the mixture is preferably 45 wt % or less. The mixing may be carried out by various mixing methods. The above-mentioned koji mold is then added to the resulting mixture. The preferred mixing ratio of the koji mold is from 0.05 to 0.1 wt % with respect to the total weight of the mixture. With the mixing ratio of less than 0.05 wt %, the fermentation efficiency is decreased, tendency to rot is increased, and the productivity is lowered. With mixing ratio greater than 0.1 wt %, the increasing cost for koji mold makes it less suitable for industrial waste treatment.

The production method of the animal feed according to the present invention is characterized by fermenting a mixture of the above-mentioned grain materials, and/or fiber materials, and one of fish broth, fish viscera, animal wastes, and distillatory effluents, which is followed by the drying of the mixture and the adjustment of the water content of the final product. The fermentation, the drying, and the water-content controlling may be carried out in one step or in a plurality of steps involving addition of further materials.

In the case of the method comprising one step, the above-mentioned grain materials and/or fiber materials are mixed with one of fish broth, fish viscera, animal wastes, and distillatory effluents, with the mixing ratio described above. The koji mold is added to the resulting mixture in an amount within the range described above in terms of weight %. The fermentation begins spontaneously. Heat is generated when the fermentation takes place. The mixture is dried by making use of the heat generated by the fermentation. The water content in the crude mixture is preferably 45 wt % or less. The water content in the final product is preferably 30 wt % or less, more preferably 20 wt % or less, and even more preferably 10 wt % or less. The water content greater than 30 wt % causes the total volume to increase, which makes storage and transportation of the products difficult. This is also unfavorable since a product with high water content has a reduced storage life and could readily rot.

During fermentation, it is preferred to control the temperature to facilitate, or to suppress, fermentation. The preferred fermentation temperature for koji mold is in the range of 30° C. to 50° C. The temperature is therefore controlled to this range. An economical and effective way of doing this is to drive a current of air onto the mixture by a fan, or the like. Also, depending on the humidity in the system, a current of hot air may be employed to facilitate the drying of the mixture. The air may be heated using, for example, a steam heater.

For the purpose of increasing the concentration of effective ingredients in the final product, the animal feed according to the present invention may be produced by a method comprising a plurality of steps in which further material is added and the fermentation, the drying and the water-content adjustment are subsequently carried out. After this second step, controlling the water content is crucial. In general the active range of water content for typical bacteria growth is 0.91–1.00 and that for typical yeast 0.88–1.00, while that for koji mold is 0.80–1.00. Therefore, the best way to exclusively promote the growth of the koji mold is by regulating the active range of water content to be in the range of 0.80–0.87. In such a case, the following steps must be followed.

In a two-step method, when the water content of the mixture obtained from the above-described one-step method is decreased from 45 wt % down to 35 wt % after the fermentation and drying, additional industrial waste is mixed with the mixture such that the water content after mixing is from 40 to 45 wt %. This is followed by further fermentation and drying to obtain a product with a water content of 30 wt % or less.

In a three-step method, when the water content of the mixture obtained from the above-described two-step method is decreased to 35 wt % or less, further industrial waste is added to the mixture and mixed such that the water content after mixing is from 40 to 45 wt %. This is followed by a third fermentation and drying to obtain a product with a water content of 30 wt % or less.

Though the number of the steps in the method is not limited, too many steps may result in insufficient fermentation. Therefore, the method may preferably comprise at most three steps as described above.

Table 1 below shows the effectiveness of the present invention. As shown in the table, the cow waste and bran mixture processed according to the present invention is richer in crude protein with comparison to the mere mixture of the same materials without processing.

TABLE 1

Comparison of crude protein and other ingredients (wt %)

|  | Crude Protein | Crude Fat | Nitrogen-free Materials | Crude Fiber | Crude ash |
|---|---|---|---|---|---|
| Cow Waste | 25.2 | 4 | 54.8 | 8 | 8 |
| Bran | 17.7 | 4.7 | 61.4 | 10.5 | 5.7 |
| Cow Waste/Bran Mixture | 19.5 | 4.5 | 59.7 | 9.8 | 6.3 |
| Fermented Cow Waste/Bran Mixture | 23 | 4 | 49.5 | 14.5 | 9 |

The present invention will now be described in detail by explanatory examples, which are to be considered as illustrative, rather than restrictive.

EXAMPLE 1

200 kg of bran (14 wt % water content) were mixed with 100 kg of fish broth effluent (95 wt % water content). The amount of water in this mixture was 123 kg and the water content of the mixture was 41 wt %. 300 g of spores of aspergillus (0.1 wt % with respect to the total weight of the mixture) were added to the mixture. The mixture was thoroughly mixed. After sterilizing it by steaming, the crude mixture into which koji mold had been thoroughly mixed was placed in a fixed-type air conductive incubator.

With the growth of the mold, generation of heat started approximately 12 hours after the mixing of the mold. A stream of air was driven onto the mixture as necessary to hold the temperature in the optimum range of 30° C. to 50° C. The growth of the mold was then maximized 17 to 30 hours after fermentation was initiated and the temperature was increased to 45° C. The fermentation continued further. Hot air heated by a steam heater was driven onto the mixture 33 hours after the initiation of fermentation to dry the mixture further. As a result, 190 kg of animal feed (i.e. fermentation product) of the present invention having a water content of 10 wt % were obtained 48 hours after the initiation of fermentation.

EXAMPLE 2

200 kg of bran (14 wt % water content) were mixed with 100 kg of fish broth effluent (95 wt % water content). 200 g of spores of aspergillus (0.06 wt %) were added to the mixture and mixed thoroughly. After sterilizing it by steaming, the crude mixture into which koji mold had been thoroughly mixed was placed in a fixed-type air conductive incubator.

As the mold grew, generation of heat was observed approximately 12 hours after the mixing of the mold. A stream of air was driven onto the mixture sufficient to hold the temperature in the optimum range of 30° C. to 50° C. 36 hours after the initiation of fermentation when the water content became 30 wt %, 50 kg of additional fish broth effluent (95 wt % water content) were added to make a mixture with the water content of 41 wt %. The growth of the mold was then maximized and the temperature was increased to 48° C.

50 kg of additional fish broth effluent (95 wt % water content) were added after 60 hours when the water content became 32 wt % to make a mixture with 44 wt % water content. A stream of hot air, passed through a steam heater, was driven onto the mixture to increase the drying efficiency. As a result, 190 kg of animal feed (i.e. fermentation product) of the present invention having a water content of 10 wt % were obtained 84 hours after the initiation of fermentation.

EXAMPLE 3

200 kg of bran (14 wt % water content) were mixed with 200 kg of fish viscera. 200 g of spores of aspergillus (0.05 wt %) were added to the mixture. After sterilizing the mixture by steaming, the water content of the mixture was 45 wt %. The crude mixture into which koji mold had been thoroughly mixed was placed in a fixed-type air conductive incubator.

With the growth of the mold, generation of heat was observed approximately 12 hours after the admixture of the mold. A stream of air was driven onto the mixture to sufficient to control the temperature in the optimum range of 30° C. to 50° C. 24 hours after the initiation of fermentation when the water content became 30 wt %, 100 kg of additional fish viscera were added to the mixture. This made a mixture with 41 wt % water content. The growth of the mold was then maximized and the temperature of the mixture was increased to 50° C.

48 hours after the mixing of the mold when the water content became 30 wt %, 100 kg of further fish viscera were added to the mixture. This made a mixture with 41 wt % water content. As a result, 220 kg of animal feed (i.e. fermentation product) of the present invention having a water content of 20 wt % were obtained 72 hours after the initiation of fermentation.

EXAMPLE 4

200 kg of bran (14 wt % water content) were mixed with 150 kg of animal waste (cows) (75 wt % water content). The mixture was sterilized by steaming for 30 minutes. After sterilization, the mixture was cooled to 45° C. and 200 g of spores of aspergillus (0.06 wt %) were added. The mixture was thoroughly mixed. The mixture had a water content of 40 wt %. The crude mixture into which koji mold had been thoroughly mixed was placed in a fixed-type air conductive incubator.

With the growth of the mold, generation of heat was observed approximately 12 hours after the mixing of the mold, while the odor of animal waste disappeared. A stream of air was driven onto the mixture to hold the temperature in the optimum range of 30° C. to 50° C. 24 hours after the initiation of fermentation when the water content became 30 wt %, 50 kg of additional sterilized animal waste (75 wt % water content) were added to the mixture. This made a mixture with 35 wt % water content. The growth of the mold was then maximized and the temperature of the mixture was increased to 48° C.

36 hours after the mixing of the mold when the water content became 30 wt %, 50 kg of additional sterilized animal waste (75 wt % water content) were added to the mixture. This made a mixture with 35 wt % water content. A stream of hot air, passed through a steam heater, was driven onto the mixture to increase the drying efficiency. As a result, 220 kg of animal feed (i.e. fermentation product) of the present invention having a water content of 10 wt % were obtained 60 hours after the initiation of fermentation.

Also, it was found that the animal feed of the present invention had significantly facilitated digestion in the livestock animals fed with the animal feed of the present invention.

EXAMPLE 5

1 ton of bran (14 wt % water content) were mixed with 500 liters of distillatory effluent (95 wt % water content). After sterilization, the mixture was cooled to 40° C. and 1 kg of spores of aspergillus were added. The mixture was further cooled to 35° C. The mixture had the water content of about 41 wt %. The crude mixture with which koji mold bad been thoroughly mixed was placed in a fixed-type air conductive incubator. With the growth of the mold, generation of heat was observed approximately 8 hours after the mixing of the mold. A stream of air was driven onto the mixture to hold the temperature in the optimum range. 24 hours after the initiation of fermentation when the water content became 35 wt %, 200 liters of additional distillatory effluent were added to the mixture. This made a mixture with 43 wt % water content. The growth of the mold was then maximized and the temperature of the mixture was controlled to 40° C. As a result, 60 hours after the mixing of the mold, 1 ton of animal feed (i.e. fermentation product) of the present invention having a water content of 30 wt % was obtained.

While there has been described what are at present considered to be preferred embodiments of the present invention, it will be understood that various modifications may be made thereto, and it is intended that the appended claims cover all such modifications as fall within the true spirit and scope of the invention.

I claim:

1. An animal feed comprising a grain material and/or a fiber material, an industrial waste containing protein of animal origin, koji mold and digestive enzymes produced thereby.

2. An animal feed according to claim 1, wherein the industrial waste containing protein of animal origin is an industrial waste selected from fish-broth effluents, fish viscera, and animal wastes.

3. An animal feed according to claim 1 or 2, wherein the water content is 30 wt % or less.

4. An animal feed produced by mixing a grain material and/or a fiber material with at least one industrial waste selected from fish-broth effluent, fish viscera, and animal waste, to form a mixture, adding koji mold to the mixture to cause fermentation, and drying it to form the animal feed.

5. The animal feed according to claim 4, wherein the mixing ratio of the grain material and/or the fiber material to the industrial waste is from 1:0.5 to 1:2 by weight.

6. The animal feed according to claim 4 or 5, wherein the koji mold is added to the mixture in an amount in the range of 0.05 wt % to 0.2 wt % with respect to the weight of the mixture.

7. The animal feed according to claim 4 or 5, wherein the water content of the animal feed after the fermentation and the drying is 30 wt % or less.

8. The animal feed according claim 6, wherein the water content of the animal feed after the fermentation and the drying is 30 wt % or less.

9. A method for producing animal feed, the method comprising the steps of:

mixing a grain material and/or a fiber material with at least one industrial waste selected from fish-broth effluent, fish viscera, and animal waste, to form a mixture, wherein the water content of the mixture is 45 wt % or less;

adding koji mold to the mixture to cause fermentation; and drying the mixture by utilizing heat generated by the fermentation caused by the koji mold.

10. The method for producing animal feed according to claim 9, wherein the water content of the animal feed after the fermentation and the drying is 30 wt % or less.

11. The method according to claim 9, wherein the drying step further comprises the step of mixing with the mixture an additional volume of at least one industrial waste when the water content of the mixture is to 35 wt % or less, to form a mixture having a water content in the range of 40 wt % to 45 wt %, the industrial waste being selected from fish-broth effluents, fish viscera, and animal the mixture being allowed to continue with fermentation and drying to form an animal feed with a water content of 30 wt % or less.

12. The method according to claim 9, wherein the drying step further comprises the step of mixing with the mixture an additional volume of at least one industrial waste when the water content of the mixture is reduced to 35 wt % or less, to form a mixture having a water content in the range of 40 wt % to 45 wt %, the industrial waste selected from fish-broth effluent, fish viscera, and animal waste, the mixture being allowed to continue with fermentation and drying until the water content is reduced to 35 wt % or less, then mixed with a further volume of at least one industrial waste selected from fish broth effluent, fish viscera, and animal waste, to form a mixture having a water content in the range of 40 wt % to 45 wt %, the mixture being allowed to continue with fermentation and drying to form the animal feed with a water content of 30 wt % or less.

* * * * *